United States Patent [19]

Iida et al.

[11] Patent Number: 5,638,557
[45] Date of Patent: Jun. 17, 1997

[54] SINK TRAP WITH VALUABLES CAPTURE VESSEL

[75] Inventors: Noki Iida, 8043 N. 32 Dr., Phoenix, Ariz. 85051; Richard Rodriguez, 1338 E. Princess Rd., Tempe, Ariz. 85281

[73] Assignees: Noki Iida, Phoenix; Richard Rodriguez, Tempe; Chi Yang Tsang, Scottsdale; Nick P. Limparis, Tempe; Tony Linh, Mesa, all of Ariz.

[21] Appl. No.: 552,616

[22] Filed: Nov. 3, 1995

[51] Int. Cl.⁶ .................................................. B01D 35/02
[52] U.S. Cl. .............................. 4/679; 4/681; 4/DIG. 14; 137/547; 137/247.41; 137/247.51
[58] Field of Search ............................... 4/679, 681, 668, 4/695, 256.1, DIG. 14, 222; 137/247.41, 247.51, 547, 549

[56] References Cited

U.S. PATENT DOCUMENTS

| | | | |
|---|---|---|---|
| 594,169 | 11/1897 | Catsiff | 4/256.1 |
| 1,217,763 | 2/1917 | Hirrich | 4/DIG. 14 |
| 4,241,979 | 12/1980 | Chang | 4/DIG. 14 |
| 5,027,447 | 7/1991 | Pino | 4/256.1 |
| 5,075,905 | 12/1991 | Rutherford | 4/679 |
| 5,267,361 | 12/1993 | Lai | 4/679 |

*Primary Examiner*—Henry J. Recla
*Assistant Examiner*—Charles R. Eloshway
*Attorney, Agent, or Firm*—Parsons & Goltry; Robert A. Parsons; Michael W. Goltry

[57] ABSTRACT

A trap for lavatory and other kinds of sinks comprising a capture vessel for rings and other valuables and a hair interceptor is disclosed.

4 Claims, 1 Drawing Sheet

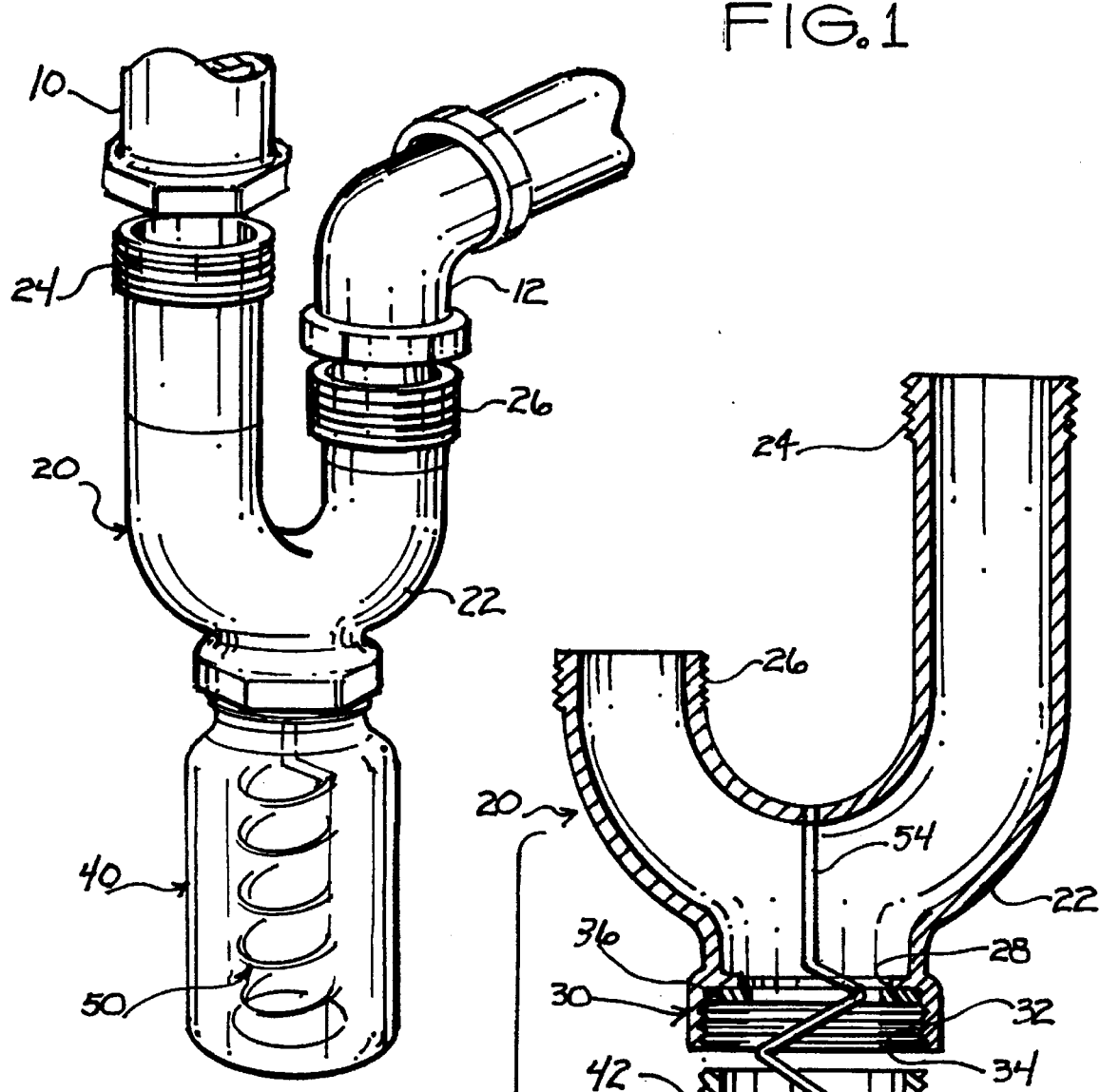

5,638,557

1

SINK TRAP WITH VALUABLES CAPTURE VESSEL

FIELD OF THE INVENTION

This invention relates to plumbing devices, specifically traps for lavatory sinks and other sinks.

BACKGROUND OF THE INVENTION

It is traditional to install, and most building codes require, a trap below sinks. Typically, these traps comprise an inflow pipe extending downwardly into one side of a U-shaped trap and an outflow pipe extending from the other side of the U-shaped trap. These are sometimes referred to as goose necks or goose neck traps. In some industrial traps, a removable plug is provided at the bottom of the U-shaped trap.

Frequently, users of lavatory sinks, especially, and also of kitchen and other sinks, drop rings, ear rings, and other small jewelry items into the sink. One of the most serious disadvantages of the prior art goose neck traps is they permit, indeed the flow of water in such traps tends to force, the passage of these small valuables through the trap to the sewer system. This is a very serious drawback because these items are often very costly and, frequently, are of irreplaceable personal value to the owner.

Sinks of all kinds tend to clog and it is often necessary, in the prior art devices, to remove the U-shaped trap and clean it out. This involves loosening two clamping nuts that compress washers into a watertight sealing relationship between the U-shaped trap and the inflow pipe and the outflow pipe. These seals are fragile and often do not reseal properly, resulting in a leaking drain system. This procedure is difficult and time consuming and, in closed spaces, may require special tools to accomplish.

Hair flowing into drains presents one of the greatest sources of drain and trap clogging materials. While hair is biodegradable, such degradation takes a very long time; consequently, hair tends to accumulate over a period of weeks and months and eventually plugs the drain pipe. The accumulating hair collects other debris and builds a plug out of debris which, but for the hair, would flow through the drain system without problems.

It is an object of the present invention to provide a solution to these and other problems and to overcome the disadvantages of the prior art.

SUMMARY OF THE INVENTION

The present invention is a sink trap constructed and adapted to be connected to an inflow pipe from a sink and an outflow pipe to a sewer system. As is common with respect to sink traps, the trap is constructed and configured to be oriented, in use, in a generally vertical plane. The trap, in such orientation, may properly be said to have a top and a bottom. The trap comprises an U-shaped pipe having upwardly extending inlet and outlet ends and a bottom that forms and defines a bottom opening. Means are provided for connecting the inlet and outlet ends, respectively, U-shaped pipe to the inflow and the outflow pipes. A capture vessel that, preferably, is elongate, having a top opening and a bottom is provided. In the most preferred embodiment capture vessel is generally transparent. The capture vessel is removably connected by any suitable connecting means in fluid communication with the bottom opening in the U-shape pipe and in watertight sealed relation with the U-shaped pipe. The U-shaped pipe and capture vessel are so constructed and configured that small heavy objects entering the U-shaped pipe fall into the capture vessel. Also in the preferred embodiment, the trap further comprises a hair interceptor in the capture vessel extending through the opening in the bottom of the U-shaped pipe and to the top inside of the bottom of the U-shaped pipe. The hair interceptor is preferably an elongate resilient member and, in the most preferred embodiment, is an elongate resilient member, at least a portion of which is configured to define a helix.

BRIEF DESCRIPTION OF THE DRAWING

FIG. 1 of the drawing is an exploded perspective view of the present invention.

FIG. 2 is a cross-sectional view of the present invention taken substantially in the center of the trap of the invention in a vertical plane as the device would be positioned in use.

DESCRIPTION OF THE PREFERRED EMBODIMENTS

The drawing depicts and the following discussion describes the presently preferred embodiment. There are several variations as to size, materials, configuration of components, etc., that will be readily apparent to those skilled in the art and which are encompassed within the invention. Materials, for example, are not critical. Pipes may be made of plastic, e.g., ABS (acrylonitrile-butadiene-styrene copolymer), vinyl, etc., or of metal, e.g., cast iron, brass, etc., and the capture vessel may be made of glass or any transparent plastic, e.g., polystyrene, PLEXIGLAS® or other polymethyl methacrylate or acrylic polymers, etc.

Referring to FIGS. 1 and 2, the sink trap with a valuables capture vessel of this invention is configured and constructed to connect in a watertight sealed relationship with an inflow pipe 10 and an outflow pipe 12.

The sink trap with a valuables capture vessel comprises a generally U-shaped trap 20, a valuables capture vessel 40, and, received in the valuables capture vessel 40 and extending into the trap 20, a hair interceptor 50.

The trap 20 comprises a generally U-shaped pipe 22 having an inlet end 24 that comprises means for being connected in a watertight sealed relationship to an inflow pipe 10 which may be of any material or type. The U-shaped pipe 22 also comprises an outlet end 26 that comprises means for being connected in a watertight sealed relationship to an outflow pipe 12 (see FIG. 1) which, likewise, may be of any material or type. These respective connecting means, 24 and 26, may be threads, washers, flanges, nuts, or a combination of these structures, or any other suitable connecting means.

The U-shaped pipe 22 is, in use, oriented so that the ends extend upwardly, the U-shaped pipe being oriented generally vertically; hence, the uses of "up", "down," "top", and "bottom," and other related terms, have reference to the device in its normal use orientation.

Referring to FIG. 2, the bottom of the U-shaped pipe 22 is so constructed and configured as to define an opening 28 and, circumscribing the opening, means 30 for connecting the opening in the pipe 22 in liquid communication with the capture vessel 40. The connecting means 30 is conveniently in the form of a flange 32 having formed internally thereof threads 34. Any other connecting means that permits the capture vessel 40 to be secured in watertight fluid communication with the opening 30 in the pipe 22 may be used. For example, a quick-release bayonet connector may be used in lieu of the threaded connector. Sealing means such as the gasket 36, which may be an O-ring gasket, flat gasket, or any other fluid sealing gasket, may be provided as part of the connecting means; however, connecting means that form a fluid tight seal without a gasket may also be used.

The capture vessel 40 is formed of a clear or approximately clear material. Glass is a very satisfactory, reliable and inexpensive material; indeed, glass bottles of standard configurations may be used. Clear plastics, such as the acrylic polymers, polycarbonates, polystyrenes, polyethylenes and polypropylenes may also be conveniently used. Some of these, such as the polyethylenes, may self-seal to the connecting means 30 without the need of a gasket. The capture vessel 40 comprises connecting means 42 formed at the upper end thereof for connecting in a fluid-tight seal with the connecting means 30 of the U-shaped pipe 22, the interior of pipe 22 being in fluid communication with the interior of the vessel 40. Again, a simple thread connecting means, or other connecting means, may be used.

Received inside the vessel is a hair interceptor 50. The hair interceptor 50 may be in various configurations and materials, but is advantageously constructed of a resilient material so as to form, in effect, a spring extending from the bottom of the capture vessel 40 to the upper inside of the U-shaped pipe 22. The hair interceptor may, for example, comprise a helical portion 52 which may extend from the bottom of the vessel to the upper inside of the pipe 22 or, as depicted in the preferred embodiment of FIG. 2, may also comprise a straight portion 54 that extends from a helical portion 52 to the upper inside of the pipe 22 at the bottom of the "U" defined by the shape of the pipe.

In the event the user of the sink from which the trap receives water drops a ring or other small valuable, the item will fall into the capture vessel 40. The vessel is, as described above, transparent or substantially transparent so that the user can frequently ascertain the location in the vessel of the item.

The vessel 40 is, by reason of the connecting means described, easily removed from its connection with the U-shaped pipe 22 without disturbing the fluid tight connections of the trap to the inflow and outflow pipes. The contents of the vessel can be poured into a larger flat vessel or through a screen to permit easy recovery of the ring or other valuable item.

The hair interceptor 50 will intercept most hair and the force of gravity and the flow of water through the U-shaped pipe moves the intercepted hair down the hair interceptor into the vessel 40, thus removing it from the flow path.

If there is a plug in the trap system, the vessel 40 can be removed quickly and easily to be cleaned and to permit direct access to the U-shaped pipe for cleaning the trap.

These multiple advantages flow from the combination of structures that make up the sink trap with a valuables capture vessel of this invention as defined in the appended claims.

Industrial Application

This invention finds application in the plumbing industry. What is claimed is:

1. A sink trap constructed and adapted to be connected to an inflow pipe from a sink and an outflow pipe to a sewer system and to be oriented in use in a generally vertical plane with a top and a bottom, said trap comprising, in combination:

a U-shaped pipe having an inlet end and an outlet end, a flow path therebetween and defining an opening in the bottom thereof;

means for connecting the inlet end of the U-shaped pipe to the inflow pipe from the sink;

means for connecting the outlet end of the U-shaped pipe to the outflow pipe;

a capture vessel;

means for removably connecting the capture vessel in fluid communication with the bottom opening in the U-shaped pipe and in watertight sealed relation with the U-shaped pipe;

the U-shaped pipe and capture vessel being so constructed and configured that small heavy objects entering the U-shaped pipe fall into the capture vessel; and a hair interceptor including a resilient strand carried by the capture vessel and extending through the opening in the bottom of the U-shaped pipe into the flow path to a position proximate a top inside portion of the bottom of the pipe, said resilient strand being compressed between said capture vessel and said top inside portion of said pipe;

whereby the strand captures hair and, in the absence of cross pieces coupled thereto, the force of water flowing through said U-shaped pipe drives the hair along the strand to be deposited in the capture vessel and clear the flow path in the U-shaped pipe.

2. The sink trap of claim 1 wherein the strand includes at least a portion which is helical.

3. A sink trap constructed and adapted to be connected to an inflow pipe from a sink and an outflow pipe to a sewer system and to be oriented in use in a generally vertical plane with a top and a bottom, said trap comprising, in combination:

a U-shaped pipe having an inlet end and an outlet end and defining an opening in the bottom thereof;

means for connecting the inlet end of the U-shaped pipe to the inflow pipe from the sink;

means for connecting the outlet end of the U-shaped pipe to the outflow pipe;

an elongate capture vessel having a top and a bottom;

means for removably connecting the top of the capture vessel in fluid communication with the bottom opening in the U-shape pipe and in watertight sealed relation with the U-shaped pipe; and a hair interceptor including a resilient strand carried by the capture vessel and extending through the opening in the bottom of the U-shaped pipe into the flow path to a position proximate a top inside portion of the bottom of the pipe said resilient strand being compressed between said capture vessel and said top inside portion of said pipe;

whereby the strand captures hair and, in the absence of cross pieces coupled thereto, the force of water flowing through said U-shaped pipe drives the hair along the strand to be deposited in the capture vessel and clear the flow path in the U-shaped pipe.

4. The sink trap of claim 3 wherein the strand includes at least a portion which is helical.

* * * * *